(12) United States Patent
Samuel et al.

(10) Patent No.: US 10,776,488 B2
(45) Date of Patent: Sep. 15, 2020

(54) EXTEND ROOT OF TRUST TO INCLUDE FIRMWARE OF INDIVIDUAL COMPONENTS OF A DEVICE

(71) Applicant: Dell Products L. P., Round Rock, TX (US)

(72) Inventors: Balasingh P. Samuel, Round Rock, TX (US); Richard M. Tonry, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 137 days.

(21) Appl. No.: 16/139,353

(22) Filed: Sep. 24, 2018

(65) Prior Publication Data

US 2020/0097658 A1 Mar. 26, 2020

(51) Int. Cl.
| | |
|---|---|
| *G06F 21/57* | (2013.01) |
| *G06F 11/07* | (2006.01) |
| *G06F 9/4401* | (2018.01) |
| *G06F 21/51* | (2013.01) |
| *G06F 21/64* | (2013.01) |

(52) U.S. Cl.
CPC .......... *G06F 21/572* (2013.01); *G06F 9/4401* (2013.01); *G06F 11/0793* (2013.01); *G06F 21/51* (2013.01); *G06F 21/575* (2013.01); *G06F 21/64* (2013.01)

(58) Field of Classification Search
CPC .... G06F 3/123; G06F 9/4401; G06F 11/0793; G06F 11/0796; G06F 11/1417; G06F 21/50; G06F 21/51; G06F 21/57; G06F 21/572; G06F 21/575; G06F 21/64; G06F 21/70

See application file for complete search history.

(56) References Cited

U.S. PATENT DOCUMENTS

| | | | | |
|---|---|---|---|---|
| 5,944,821 | A * | 8/1999 | Angelo | G06F 21/51 726/22 |
| 7,073,064 | B1 * | 7/2006 | Angelo | G06F 21/575 710/10 |
| 7,121,460 | B1 * | 10/2006 | Parsons | G06Q 20/341 235/379 |
| 8,413,130 | B2 * | 4/2013 | Madduri | G06F 21/572 717/168 |

(Continued)

*Primary Examiner* — Thomas J. Cleary
(74) *Attorney, Agent, or Firm* — Campbell Stephenson LLP; Shiv S. Naimpally

(57) ABSTRACT

In some examples, a boot process of a computing device may be initiated. The computing device may include a plurality of hardware components. The process may select a component of the plurality of hardware components, read a firmware of the component, calculate a measurement (e.g., hash) of the firmware, and perform a comparison of the measurement with a pre-determined measurement stored in a table of approved firmware. The table may be stored in a basic input output system (BIOS) of the computing device. The process may determine, based on the comparison, that the measurement does not match the pre-determined measurement stored in the table, acquiring a new table from a server, verify an authenticity of the new table, determine that the measurement does not match a current measurement stored in the new table, and perform one or more remedial actions based on a policy.

20 Claims, 8 Drawing Sheets

(56) References Cited

U.S. PATENT DOCUMENTS

| | | | | |
|---|---|---|---|---|
| 9,110,679 B1* | 8/2015 | Chan | ............... | G06F 9/4411 |
| 2002/0026634 A1* | 2/2002 | Shaw | ............... | G06F 21/51 |
| | | | | 717/173 |
| 2008/0244553 A1* | 10/2008 | Cromer | ............... | G06F 21/572 |
| | | | | 717/168 |
| 2008/0263345 A1* | 10/2008 | Booth | ............... | G06F 21/572 |
| | | | | 713/2 |
| 2011/0289305 A1* | 11/2011 | Zimmer | ............... | G06F 21/44 |
| | | | | 713/1 |
| 2012/0030731 A1* | 2/2012 | Bhargava | ............... | G06F 21/54 |
| | | | | 726/3 |
| 2012/0173867 A1* | 7/2012 | Hirabayashi | ............... | G06F 21/51 |
| | | | | 713/150 |
| 2013/0047144 A1* | 2/2013 | Chalmers | ............... | G06F 8/654 |
| | | | | 717/168 |
| 2014/0250291 A1* | 9/2014 | Adams | ............... | G06F 21/57 |
| | | | | 713/2 |
| 2014/0279985 A1* | 9/2014 | Fontenot | ............... | G06F 21/51 |
| | | | | 707/698 |
| 2015/0074384 A1* | 3/2015 | Yajima | ............... | G06F 21/575 |
| | | | | 713/2 |
| 2015/0149989 A1* | 5/2015 | Lu | ............... | G06F 8/658 |
| | | | | 717/170 |
| 2017/0372076 A1* | 12/2017 | Poornachandran | ............... | G06F 21/74 |
| 2018/0075241 A1* | 3/2018 | Gomez | ............... | G06F 21/565 |
| 2018/0330095 A1* | 11/2018 | Packer Ali | ............... | G06F 21/575 |
| 2018/0365424 A1* | 12/2018 | Callaghan | ............... | G06F 21/575 |
| 2019/0108009 A1* | 4/2019 | Haase | ............... | G06F 21/572 |
| 2020/0082090 A1* | 3/2020 | Samuel | ............... | G06F 8/65 |

* cited by examiner

EXTEND ROOT OF TRUST TO INCLUDE FIRMWARE OF INDIVIDUAL COMPONENTS OF A DEVICE

BACKGROUND OF THE INVENTION

Field of the Invention

This invention relates generally to computing devices and, more particularly to reducing the downtime associated with applying a patch (e.g., to address bugs and/or add new features) to multiple databases in a database system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A computing device may have a firmware, known as a basic input output system (BIOS). The BIOS may be stored in non-volatile memory and may be used to perform hardware initialization during a boot process (e.g., power-on). The BIOS may load a boot loader from memory (e.g., random access memory (RAM)) and the bootloader may load an operating system of the computing device. Individual hardware components of the computing device may each have their own particular firmware. For example, the hardware components that have updateable firmware may include components, such as, for example, a trusted platform module (TPM) component, imaging component (e.g., built-in camera), Bluetooth® components, network components, Thunderbolt®, and universal serial bus (USB) Power Delivery (PD) devices. The BIOS may provide a root of trust and extend the root of trust to a bootloader and to the operating system (OS) that the bootloader loads. However, the root of trust of the BIOS does not currently extend to the firmware of hardware components of a computing device.

Multiple firmware associated with corresponding components of the computing device may be updated separately from a BIOS update and are not verified. One reason is that most of the components have rudimentary microcontrollers that do not support firmware verification. Because the BIOS root of trust does not extend to the firmware of individual components, the firmware can be compromised (e.g., tampered with), enabling rogue code to be injected into the firmware of one or more components and executed during pre-boot (and from within the OS). To avoid a security threat, some operating system manufacturers recommend avoiding updating component firmware of these components. However, not updating the firmware of components of a computing device may be unavoidable because firmware updates of components are performed to fix bugs, add features, address security vulnerabilities, or any combination thereof.

Thus, computing devices are vulnerable to security breaches performed by loading malicious code into a firmware of a hardware component. For example, by loading malicious code into a firmware of a camera (e.g., or other imaging device) of a computing device, the camera's indicator light can be turned off, giving a user of the computing device the impression that the camera is inactive while the camera is being used to view the user entering confidential information, such as a username, password, or the like. As another example, by loading malicious code that includes a key logger into a firmware of a keyboard (e.g., or other input device) of a computing device, the key logger can be used to log the key strokes of the user entering confidential information, such as a username, password, or the like.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a boot process of a computing device may be initiated. The computing device may include a plurality of hardware components. The process may select a component of the plurality of hardware components, read a firmware of the component, calculate a measurement (e.g., hash) of the firmware, and perform a comparison of the measurement with a pre-determined measurement stored in a table of approved firmware. The table may be stored in a basic input output system (BIOS) of the computing device. The process may determine, based on the comparison, that the measurement does not match the pre-determined measurement stored in the table, acquiring a new table from a server, verify an authenticity of the new table, determine that the measurement does not match a current measurement stored in the new table, and perform one or more remedial actions based on a policy.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
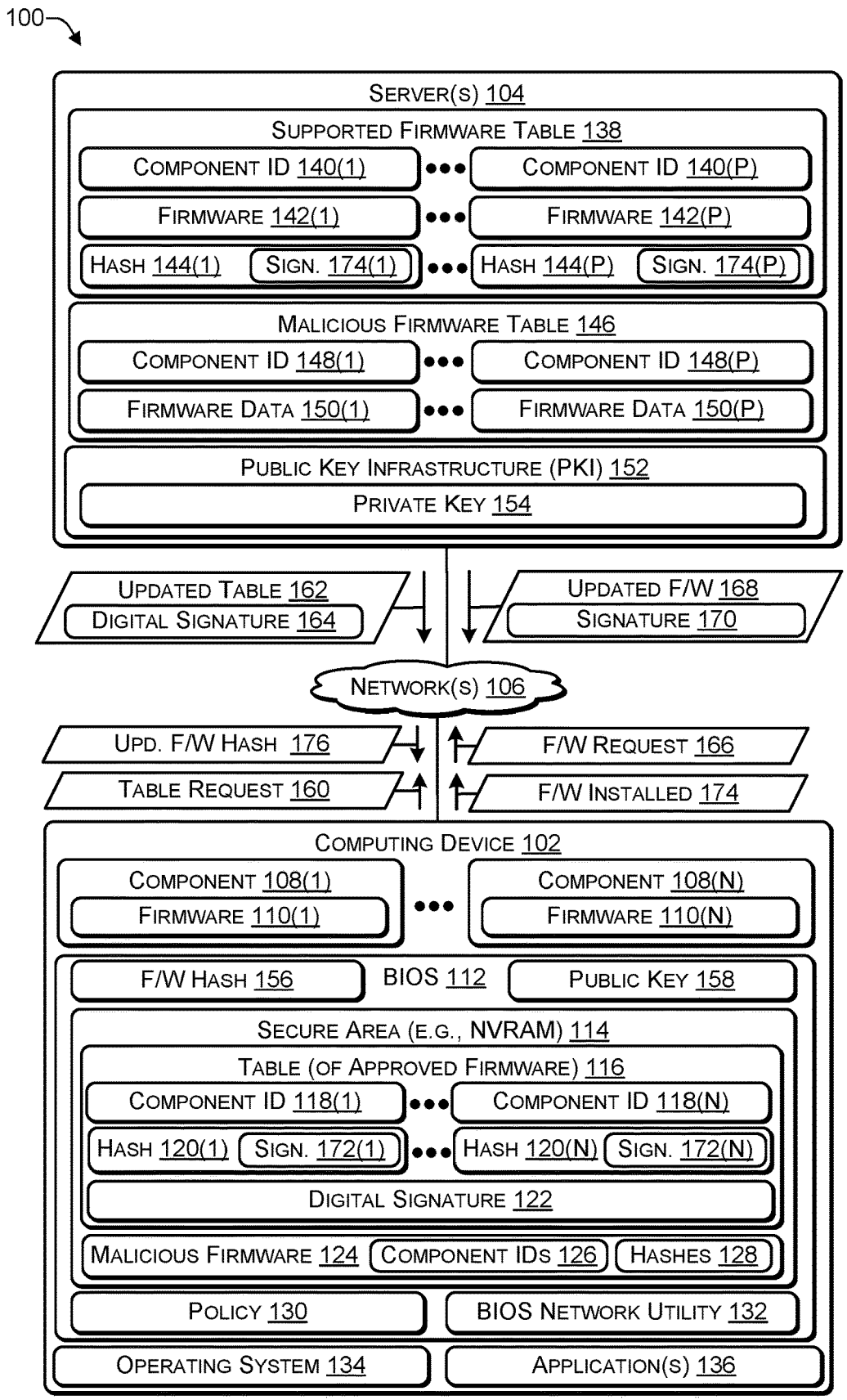
FIG. 1 is a block diagram of a system that includes a BIOS to verify a firmware of individual components of a computing device, according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein enable a root of trust of a computing device to be extended from the basic input output system (BIOS) to the firmware of hardware components of the computing device. The systems and techniques provide a secure method to verify the integrity of firmware of a component, verify a firmware update of the component, update a firmware of the component, and automatically (e.g., without human interaction) recover from corrupt firmware.

The BIOS of a computing device is provided with a table (or other type of data structure) of approved firmware and a corresponding measurement, such as a hash, for the firmware. A hash function is a function that takes the firmware of a component and maps the firmware to a hash value. To prevent rogue actors from spoofing the hash value, each hash value may be digitally signed, e.g., using a public key infrastructure (PKI) or similar mechanism. The hash value provided by a hash function may be referred to as a hash value, a hash code, a digest, a hash, or the like. The examples herein may reference a hash as a measurement associated with a firmware. However, it should be understood that any other type of similar measurement that is similar to a hash may be used instead of a hash. In addition to each hash value being digitally signed, the hash table may be digitally signed (e.g., using the PKI) to enable the authenticity of the hash table to be determined.

The table of approved firmware may be created by a build server that (1) builds (e.g., creates) the firmware for individual components of a computing device or (2) receives trusted versions of firmware for individual components from a third party (e.g., a manufacturer of the component). The build server creates a measurement (e.g., a hash) for the firmware of each component and digitally signs each measurement with a private key. The table may be signed using the private key. The public key is stored in the BIOS and sealed. For example, the processors of the computing device may verify a signature included in the BIOS before executing the BIOS. The signature may be verified using a hash of a public key that is embedded into the system's Platform Controller Hub (PCH) by a manufacturer of the computing device. The table may be stored in a secure area, such as a non-volatile random-access memory (NVRAM), of the BIOS. A server may maintain a database that includes each approved component firmware (e.g., including a current version and previously approved versions) and the corresponding measurement. In some cases, the database on the server may include known malicious firmware and the corresponding measurement.

During a boot process (e.g., secure boot), the BIOS verifies the hash (or other measurement) of a signature of the approved firmware table. For each particular component of the computing device that uses firmware, the BIOS determines a measurement (e.g., hash) of the particular component's firmware and compares the measurement with a pre-determined measurement (associated with the particular component's firmware) that is stored in the approved firmware table. If the BIOS determined measurement matches the measurement stored in the approved firmware table, then the trust chain is intact and the boot process continues.

If the BIOS determined measurement fails to match the measurement stored in the approved firmware table, then there are two possibilities: (1) the particular component's firmware has been updated (e.g., by a manufacturer of the component) or (2) the particular component's firmware is corrupted or compromised. The BIOS connects to the server (e.g., maintained by a manufacturer of the computing device) and acquires a current (e.g., most up-to-date) version of the approved firmware table. For example, the BIOS may send a request to the server for a latest version of the approved firmware table and the server may place the latest version of the approved firmware table in a download area and provide a link to the BIOS. The BIOS may download the latest version of the approved firmware table. The BIOS may compare the BIOS determined measurement of the component's firmware with the measurement stored in the latest version of the approved firmware table. If there is a match, the BIOS update approved firmware table by replacing the older version of the approved firmware table with the latest (e.g., recently downloaded) version of the approved firmware table in the secure area (e.g., NVRAM). Because the trust chain is established, the BIOS continues the boot process. If there is not a match, the BIOS may perform one or more actions based on a policy (e.g., provided by a system administrator). For example, one of the actions in the policy may include obtaining (e.g., downloading) a trusted copy of the particular component's firmware from the server, installing the trusted copy (e.g., replacing the corrupted or compromised version of the component's firmware with the trusted copy), and resuming the boot process. In this example, the BIOS may deal with a corrupted or compromised version of the component's firmware in a manner that is transparent to a user of the computing device. Another action in the policy may include disabling the device having the compromised firmware and resuming the boot process. Yet another action in the policy may include blocking the system from booting. Another action in the policy may include notifying a user of the computing device, an information technology (IT) administrator, or both.

Thus, the root of trust established by the BIOS is extended to include the firmware of individual components of the computing device. Any component that has compromised firmware is identified before the operation system is booted. Depending on the policy, the BIOS may automatically disable components having compromised or corrupted firmware or the BIOS may automatically download and install trusted firmware to recover components that have been identified as having compromised or corrupted firmware. If a manufacturer updates the firmware of a component, the BIOS may be unaware of the update until the BIOS, during the boot process, determines that the hash of the firmware does not match the corresponding hash in the table. In such cases, the BIOS may automatically update the approved firmware table with a latest version of the table. In this way, BIOS prevents unauthorized firmware of a component (e.g., a camera, a keyboard, a hard drive, a universal serial bus (USB) port, or the like) from executing on the computing device. In addition, depending on the policy, the BIOS may automatically recover from discovering corrupt or compromised component firmware by downloading and installing a trusted version of the component firmware.

A BIOS may include instructions that are executed when a boot process of a computing device is initiated. For example, the instructions may be stored in non-volatile random-access memory (NVRAM). The computing device may include multiple hardware components, such as, for example, at least two of: an imaging device, (e.g., a camera), a keyboard, a universal serial bus (USB) controller, a display device, a video card, an audio card, a hard disk drive, a solid-state disk (SSD) drive, a network interface card (NIC), and the like. The instructions of the BIOS may be executable by one or more processors to perform various operations. For example, the operations may include initiating a boot process of a computing device.

The operations may include selecting a component of the multiple hardware components, reading a firmware of the component, and determining a measurement, such as a hash, of the firmware. The operations may include performing a comparison of the measurement with a pre-determined measurement stored in a table of approved firmware. The table of approved firmware may be stored in the BIOS of the computing device. The operations may include verifying a digital signature of the pre-determined measurement before performing the comparison of the measurement with the pre-determined measurement stored in the table of approved firmware. Based on the comparison, the operations may include determining whether the measurement matches the pre-determined measurement stored in the table. If a determination is made that the measurement matches the pre-determined measurement stored in the table, then the boot process may continue. If a determination is made that the measurement does not match the pre-determined measurement stored in the table, then the operations may include acquiring a new table from a server, and verifying an authenticity of the new table. For example, the authenticity of the new table may be verified by verifying a digital signature of the current table using a public key stored in the BIOS. The operations may include determining whether the measurement matches a current measurement stored in the new table. If a determination is made that the measurement matches a current measurement stored in the new table, then the boot process may continue. If a determination is made that the measurement does not match the current measurement stored in the new table, the operations may include performing one or more remedial actions based on a policy. For example, the policy may be created a system administrator. The one or more remedial actions may include (1) indicating (e.g., by displaying an error message to a user or sending a message to a system administrator) that the firmware of the component is corrupted, (2) disabling the component and resuming the boot process, (3) halting the boot process, or (4) automatically acquiring (e.g., downloading) a new firmware of the component from the server, installing the new firmware to replace the firmware of the component, and resuming the boot process.

The operations may include reading a second firmware of a second component of the plurality of hardware components, determining a second measurement of the second firmware, and determining whether the second measurement matches a second pre-determined measurement stored in the new table. If a determination is made that the second measurement matches a second pre-determined measurement stored in the new table, then the boot process may resume.

The operations may include receiving a notification from the server that updated firmware of a particular component is available, downloading (from the server) the updated firmware, verifying an authenticity of the updated firmware (e.g., by verifying a digital signature of the updated firmware using the public key), and installing the updated firmware of the particular component. After successfully installing the updated firmware, the operations may include informing the server that the updated firmware was successfully installed, receiving (or downloading), from the server, an updated measurement associated with the updated firmware, and modifying the table of approved firmware to include the updated measurement.

FIG. 1 is a block diagram of a system 100 that includes a BIOS to verify a firmware of individual components of a computing device, according to some embodiments. The system 100 includes one or more computing devices, such as a representative computing device 102, coupled to one or more servers 104 via one or more networks 106.

The computing device 102 may include multiple components, such as a component 108(1) to a component 108(N) (N>0). Each of the components 108 may have a corresponding firmware. For example, the component 108(1) may have a firmware 110(1) and the component 108(N) may have a firmware 110(N). The components 108 may have corresponding updateable firmware 110 and may include, for example, a trusted platform module (TPM) component, an imaging component (e.g., camera), one or more Bluetooth® components, one or more network components, one or more video components (e.g., digital video interface (DVI), high definition media interface (HDMI), Thunderbolt® or the like), universal serial bus (USB) Power Delivery (PD) devices, another type of computer component, or any combination thereof.

The computing device 102 may include a BIOS 112 that includes a secure area 114. For example, the secure area 114 may be implemented using a non-volatile memory, such as non-volatile random-access memory (NVRAM). The secure area 114 may be used to store a table 116 of approved firmware (e.g., sometimes referred to as a whitelist). The table 116 is used herein as an example of a data structure used to store information about approved firmware, e.g., firmware that is known (e.g., non-malicious). Of course, other types of data structures, such as a linked list, a database, or the like may be used instead of the table 116 to store information about approved firmware. The table 116 may include multiple component identifiers corresponding to each of the components 108, such as, for example, a component identifier 118(1) corresponding to the component 108(1) and a component identifier 118(N) corresponding to the component 108(N). The table 116 may include a measurement associated with the corresponding firmware of each component. For example, a hash 120(1) may be associated with the component ID 118(1) and the hash 120(N) may be associated with the component ID 118(N). For example, a hash function may take a particular one of the firmware 110 and map the firmware 110 to a corresponding hash 120 (e.g., a hash value). The hash value provided by the hash function is referred to herein as the hash 120, but may also be referred to as a hash value, a hash code, a digest, or the like. The examples herein may reference a hash as a measurement associated with a firmware. However, it should be understood that any other type of measurement that is similar to the hashes 120 may be used instead.

Each of the hashes 120 may be a form of measurement of the corresponding firmware 110. For example, the hash 120(1) may be a measurement (e.g., a hash value) of the firmware 110(1) of the component 108(1), and the hash 120(N) may be a measurement (e.g., a hash value) of the firmware 110(N) of the component 108(N). To prevent rogue actors from spoofing the hashes 120, each of the hashes 120 may be digitally signed, e.g., using a private key 154 of a public key infrastructure (PKI) 152 or similar mechanism. Thus, each of the hashes 120 may be encrypted with a corresponding digital signature 172 that can be used to verify an authenticity of each of the hashes 120. For example, the hash 120(1) may have a signature 172(1) to verify an authenticity of the hash 120(1) and the hash 120(N) may have a signature 172(N) to verify an authenticity of the hash 120(N). The table 116 may include a digital signature 122 to verify an authenticity of the table 116 itself. In some cases, the secure area 114 may be used to store information associated with known malicious firmware 124 (e.g., sometimes referred to as a blacklist), such as component identifiers 126 of the components 126 and the corresponding hashes 128 of firmware that has been identified as malicious.

The BIOS 112 may include at least one policy 130. The policy 130 may specify one or more actions that the BIOS 112 is to perform if the BIOS 112 determines that one or more of the components 108 has unknown (e.g., malicious) firmware. The BIOS 112 may include a utility, such as a BIOS network utility 132, to enable the BIOS 112 to communicate (e.g., using a network interface card (NIC) or other communications interface of the computing device 102) over the network 106 to external devices, such as the server 104. The computing device 102 may include an operating system 134 and one or more software applications 136.

The server 104 may include a supported firmware table 138. The supported firmware table 138 may identify which particular firmware versions are supported and have been confirmed to be non-malicious. The supported firmware table 138 may include a component ID, a corresponding firmware, and a corresponding hash associated with the firmware. For example, the supported table 138 may include a component ID 140(1), a corresponding firmware 142(1), and a corresponding hash 140(1) to a component ID 140(P), a corresponding firmware 142(P), and a corresponding hash 140(P) (P>0, P>=N). The supported firmware table 138 stored on the server 104 may include all versions of supported firmware associated with multiple computing devices (e.g., encompassing multiple product lines and multiple platforms) whereas the table of approved firmware 116 on the computing device 102 may be a subset of the supported firmware table 138 and may include approved firmware associated with the computing device 102.

The server 104 may store a malicious firmware table 146. The malicious firmware table 146 may include component identifiers (IDs) and firmware data associated with unknown firmware or firmware identified as malicious. For example, the malicious firmware table 146 may include a component ID 148(1) having a corresponding firmware data 150(1) to a component ID 148(P) having a corresponding firmware data 150(P). The firmware data 150 may include a hash (or other measurement), a version, a size, or other digital characteristics associated with firmware that has been identified as unknown or malicious. The server 104 may include the public key infrastructure (PKI) 152. The PKI 152 may include the private key 154 that the server 104 uses to sign each of the hashes 144. For example, the hash 144(1) may have a signature 174(1) created using the private key 154 and the hash 144(P) may have a signature 174(P) created using the private key 154.

When a boot process of the computing device 102 is initiated, the BIOS 112 may perform a secure boot that includes extending a root of trust of the BIOS 112 to each of the firmware 110 corresponding to each of the components 108. For example, during the boot process, the BIOS 112 may select a component, such as the component 108(1), read the corresponding firmware 110(1), determine a firmware hash 156 for the firmware 110(1), and perform a comparison of the firmware hash 156 with the hash 120(1) stored in the table 116 (e.g., the component ID 118(1) identifies the component 108(1), indicating that the hash 120(1) is associated with the firmware 110(1)). Prior to making the comparison, the BIOS 112 may verify an authenticity of the hash 120(1) by using a public key 158 (e.g., provided by the PKI 152) to verify a signature 172(1) associated with the hash 120(1). After verifying the authenticity of the hash 120(1) in the table 116, if the BIOS 112 determines that the firmware hash 156 (of the firmware 110(1)) matches the hash 120(1) in the table 116, then the BIOS 112 may proceed with selecting a next component 108 and reading the corresponding firmware, determining the firmware hash 156, verifying an authenticity of a corresponding hash in the table 116, and comparing the firmware hash 156 with the corresponding hash in the table 116, until the firmware 110 of each of the components 108 has been verified, before proceeding with a remaining portion of the boot process.

If the BIOS 112 determines that the firmware hash 156 of one of the firmware 110 does not match the corresponding hash 120 in the table 116, then the BIOS 112 may perform one or more actions based on the policy 130. For example, the BIOS 112 may select the component 108(N), read the firmware 110(N), and determine the firmware hash 156 associated with the firmware 110(N). The BIOS 112 may verify the signature 172(N) of the hash 120(N) and compare the firmware hash 156 with the hash 120(N) corresponding to the component 108(N) to determine if there is a match. If the firmware hash 156 of the firmware 110(N) does not match the corresponding hash 120(N) in the table 116, then the BIOS 112 may use the BIOS network utility 132 (or similar utility, such as Dell® BIOSConnect®) to connect to the server 104 (via the network 106) and send a table request 160 requesting an updated table. The server 104 may receive the table request 160 and, in response, send an updated table 162 that includes a latest set of hashes associated with the component identifiers 118. The updated table 162 may include a digital signature 164. The BIOS 112 may receive the updated table 162 and use the public key 158 to verify the digital signature 164 to determine an authenticity of the updated table 162. After verifying the digital signature 164 of the updated table 162 using the public key 158, the BIOS 112 may replace the table 116 with the updated table 162. The updated table 162 may include the component identifiers 118 and updates to the hashes 120. The BIOS 112 may compare the firmware hash 156 with the corresponding hash in the updated table 162. If the firmware hash 156 matches the updated hash in the updated table 162, then the BIOS 112 may continue with the boot process. If the BIOS 112 determines that the hash 156 does not match the corresponding hash in the updated table 162, then the BIOS 112 may perform one or more actions based on the policy 130. For example, the BIOS 112 may send a message to a system administrator based on the policy 130 indicating that one of the firmware 110 associated with the components 108 cannot be verified and may be corrupted or malicious. As another example, the BIOS 112 may display an error message to a user of the computing device 102 indicating that a firmware 110 of a particular one of the components 108 could not be verified. In some cases, based on the policy 130, the BIOS 112 to disable the component (e.g., 108(N)) associated with the firmware (e.g., 110(N)) and resume the boot process. For example, if the BIOS 112 determines that the firmware hash 156 of the firmware 110(N) does not match the corresponding hash 120(N) in the table 116 or in the updated table 162, the BIOS 112 may disable the component 108(N) and resume the boot process. In some cases, based on the policy 130, the BIOS 112 may stop the boot process and notify a system administrator and/or a user of the computing device 102 that one of the components 108 has unknown (e.g., unverifiable) firmware 110 and the boot process has been halted.

In some cases, based on the policy 130, the BIOS 112 may automatically download and install updated firmware for a component (e.g., the component 108(N)) based on the policy 130. For example, the BIOS 112 may use the BIOS network utility 132 (or similar utility, such as Dell® BIOSConnect®) that enables a BIOS to communicate with external devices via a network) to send a firmware request 166 to the server 104. In response, the server 104 may send updated firmware 168 that includes a signature 170 to the computing device 102. The BIOS 112 may receive the updated firmware 162 and verify an authenticity of the updated firmware 168 by using the public key 158 to verify the signature 170 of the updated firmware 168. The BIOS 112 may use the updated firmware 168 to replace the firmware (e.g., 110(N)) whose hash did not match a corresponding hash 120 in either the table 116 or in the updated table 162. For example, the BIOS 112 may determine the firmware hash 156 of the firmware 110(N) does not match the hash 120(N) in the table 116 or in the updated table 162. The BIOS 112 may send the firmware request 166, receive the updated firmware 168, verify the signature 170 using the public key 158, and replace the firmware 110(N) with the updated firmware 168. This process of replacing the firmware 110 of one of the components 108 may be done automatically and without notifying the user of the computing device 102. For example, the user may be unaware that the firmware 110 of one or more of the components 108 was replaced.

In some cases, the computing device 102 or the BIOS 112 may determine that an updated firmware is available for one of the components 108. For example, a manufacturer of the component 108(N) may send a message indicating that an updated firmware is available for the component 108(N). In response, the computing device 102 may send the firmware request 166 and receive the updated firmware 168 including the signature 170. The BIOS 112 may verify the signature 170 using the public key 158 and install the updated firmware 168 in the component 108(N), e.g., replacing the firmware 110(N) with the updated firmware 168. If the BIOS 112 successfully installs the updated firmware 168, then the BIOS 112 may send a firmware installed 174 message to the server 104 indicating that the update firmware 168 was successfully installed. In response, the server 104 may send update firmware hash 176 corresponding to the updated firmware 168. The BIOS 112 may update the table 116 to include the corresponding updated firmware hash 176 in the table 116. For example, if the updated firmware 168 was used to replace the firmware 110(N) of the component 108(N), then the updated firmware hash 176 may be used to replace the hash 120(N) in the table 116. The updated firmware hash 176 may include a corresponding signature that the BIOS 112 verifies before comparing the firmware hash 156 of the updated firmware 168 with the updated firmware hash 176 each time the BIOS 112 performs a boot process.

Thus, a BIOS may select, in turn, each component of a computing device, read the firmware of the component, determine (e.g., calculate) a measurement (e.g., a hash value) of the firmware, verify a signature of a corresponding known measurement of the component in a table, and perform a comparison of the measurement with the known measurement in the table. If the comparison indicates a match, the boot process may continue. If the comparison indicates that the firmware of the component is unknown (e.g., does not match a measurement of a known firmware), then the BIOS may perform one or more actions based on a policy. The one or more actions specified by the policy may include automatically downloading and installing a known firmware version, halting the boot process, disabling the component with the unknown (e.g., unverified) firmware, notifying a user of the computing device, notifying a system administrator, disabling the computing device, or any combination thereof. In this way, if malicious firmware is installed in one or more components (e.g., using Evil Maid or a similar hack) of a computing device, the BIOS is able to determine that an unknown firmware has been installed and take appropriate action to prevent the computing device from booting with the unknown firmware installed.

Figure 2:
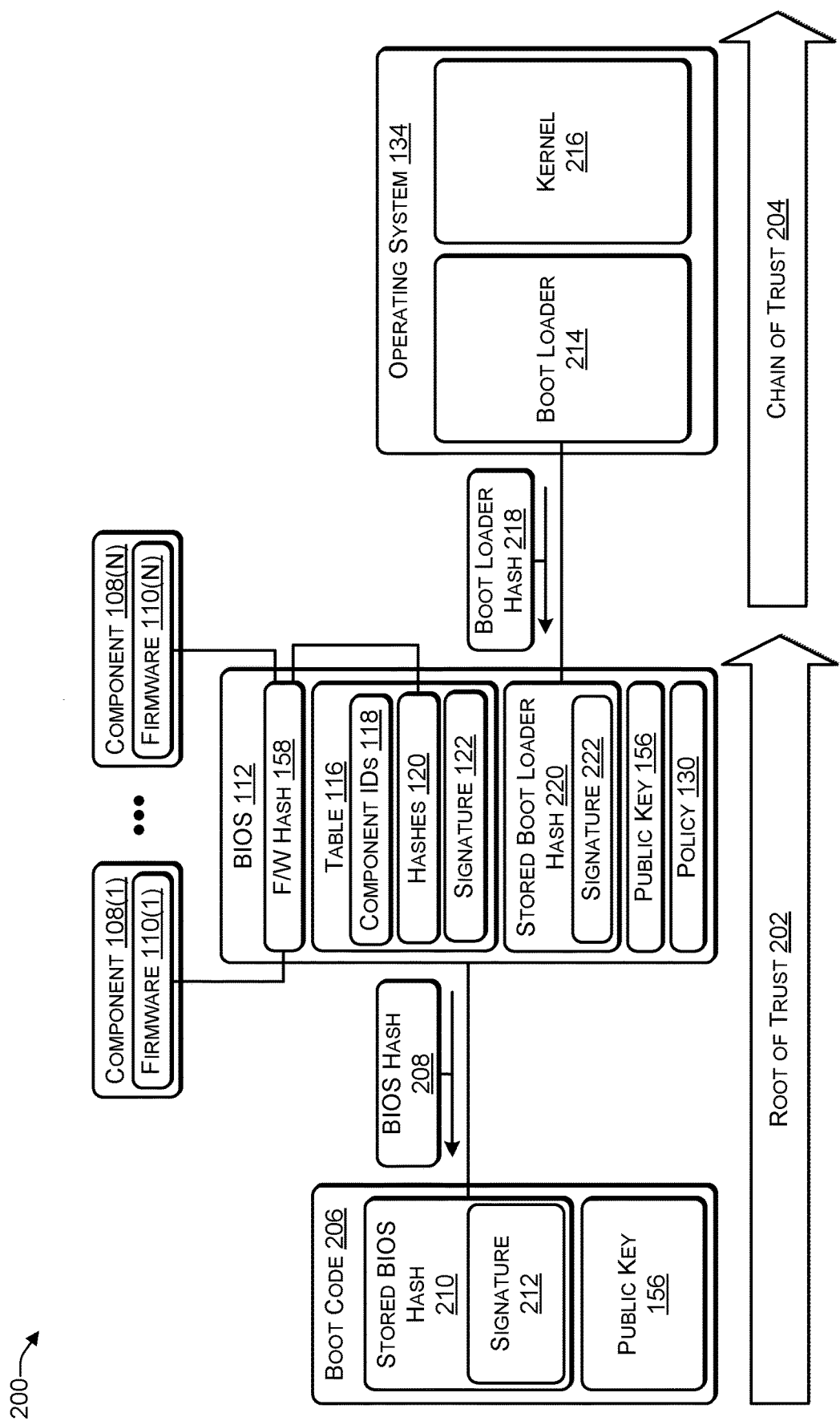
FIG. 2 is a block diagram of a system that includes extending a root of trust to verifying a firmware of individual components of a computing device, according to some embodiments.

FIG. 2 is a block diagram of a system 200 that includes extending a root of trust to verifying a firmware of individual components of a computing device, according to some embodiments. The system 200 may include a root of trust 202 and a chain of trust 204. The root of trust 202 may be established by the BIOS 112 and the chain of trust 204 may be established by the operating system 134 after the BIOS 112 hands off the boot process to the operating system 134.

The boot process may start with boot code 206 which reads the BIOS 112, determines a BIOS hash 208 of the code of the BIOS 112, verifies an authenticity of a stored BIOS hash 210, and compares the BIOS hash 208 with the stored BIOS hash 210. The boot code 206 may verify an authenticity of the stored BIOS hash 210 by verifying a signature 212 associated with the stored BIOS hash 210, e.g., using the public key 156 (e.g., provided by the PKI 152 of FIG. 1). For example, the boot code 206 may verify the signature 212 associated with the stored BIOS hash 210 and then perform the comparison of the BIOS hash 208 to the stored BIOS hash 210.

After verifying that the BIOS hash 208 matches the stored hash 210, the boot code 206 may hand over the root of trust 202 to the BIOS 112 to continue the boot process. The BIOS 112 may continue the boot process, including verifying the firmware 110 associated with each of the components 108. For example, the BIOS 112 may select one of the components 108, such as the component 108(N), and read the firmware 110(N) corresponding to the component 108(N). The BIOS 112 may determine the firmware hash 158 associated with the firmware 110(N). The BIOS 112 may compare the firmware hash 158 with a corresponding one of the hashes 120 stored in the table 116. For example, the table 116 may include the component ID 118(N) and the hash 120(N) of FIG. 1 corresponding to the component 108(N). If the BIOS 112 verifies the firmware 110 of each of the components 108 with the hashes 120 in the table 116, then the BIOS 112 may pass the root of trust 202 on to the chain of trust 204 of the operating system 134. If the BIOS 112 is unable to verify the firmware 110 of one of the components 108 with the hashes 120 in the table 116, then the BIOS 112 may perform one or more actions based on a policy (e.g., the policy 130 of FIG. 1).

The operating system 134 may include a boot loader 214 and a kernel 216. The BIOS 112 may read code associated with the boot loader 214 and determine a boot loader hash 218 of the boot loader 214. The BIOS 112 may verify an authenticity of the stored boot loader hash 220 by verifying a signature 222 associated with a stored boot loader hash 220 using the public key 156. The BIOS 112 may compare the boot loader hash 218 to the stored boot loader hash 220 that is stored in the BIOS 112. After verifying that the boot loader hash 218 matches the stored boot loader hash 220, the BIOS 112 may hand over the boot process and the chain of trust 204 to the operating system 134. The operating system 134 may extend the chain of trust 204 to include one or more software applications executing on computing device, such as the applications 136 of FIG. 1.

Thus, the BIOS root of trust may be extended to include the firmware of multiple components of a computing device. The BIOS may read the firmware code of a component and calculate a measurement (e.g., a hash value) of the firmware code. The BIOS may read a value (e.g., a hash value) in a table corresponding to the component's firmware and verify a signature of the value. The BIOS may compare the calculated measurement with the table value and determine if there is a match. If the BIOS determines that the calculated measurement matches the table value, then the BIOS may determine that the component's firmware is approved (e.g., known) firmware, and continue with the boot process, e.g., the BIOS may read the firmware of a next component and repeat the previously described process of comparing a measurement of the firmware with a verified value in a table. If the BIOS determines that the calculated measurement does not match the table value, then the BIOS may determine that the component's firmware is unknown firmware.

The BIOS may attempt to determine if the firmware has been updated by contacting a server and obtaining (e.g., downloading) an updated (e.g., current) table of component firmware values (e.g., measurements). The BIOS may verify the authenticity of the table, verify an authenticity of the corresponding value in the updated table, and compare the calculated measurement with the corresponding value in the updated table. If the BIOS determines that the calculated measurement matches the corresponding value in the updated table, then the BIOS may continue with the boot process, e.g., by reading the firmware of a next component and repeating the previously described process of comparing a measurement of the firmware with a verified value in the updated table. If the BIOS determines that the calculated measurement fails to match the corresponding value in the updated table, then the BIOS may determine that the firmware is unknown and perform one or more actions specified by a policy.

Figure 3:
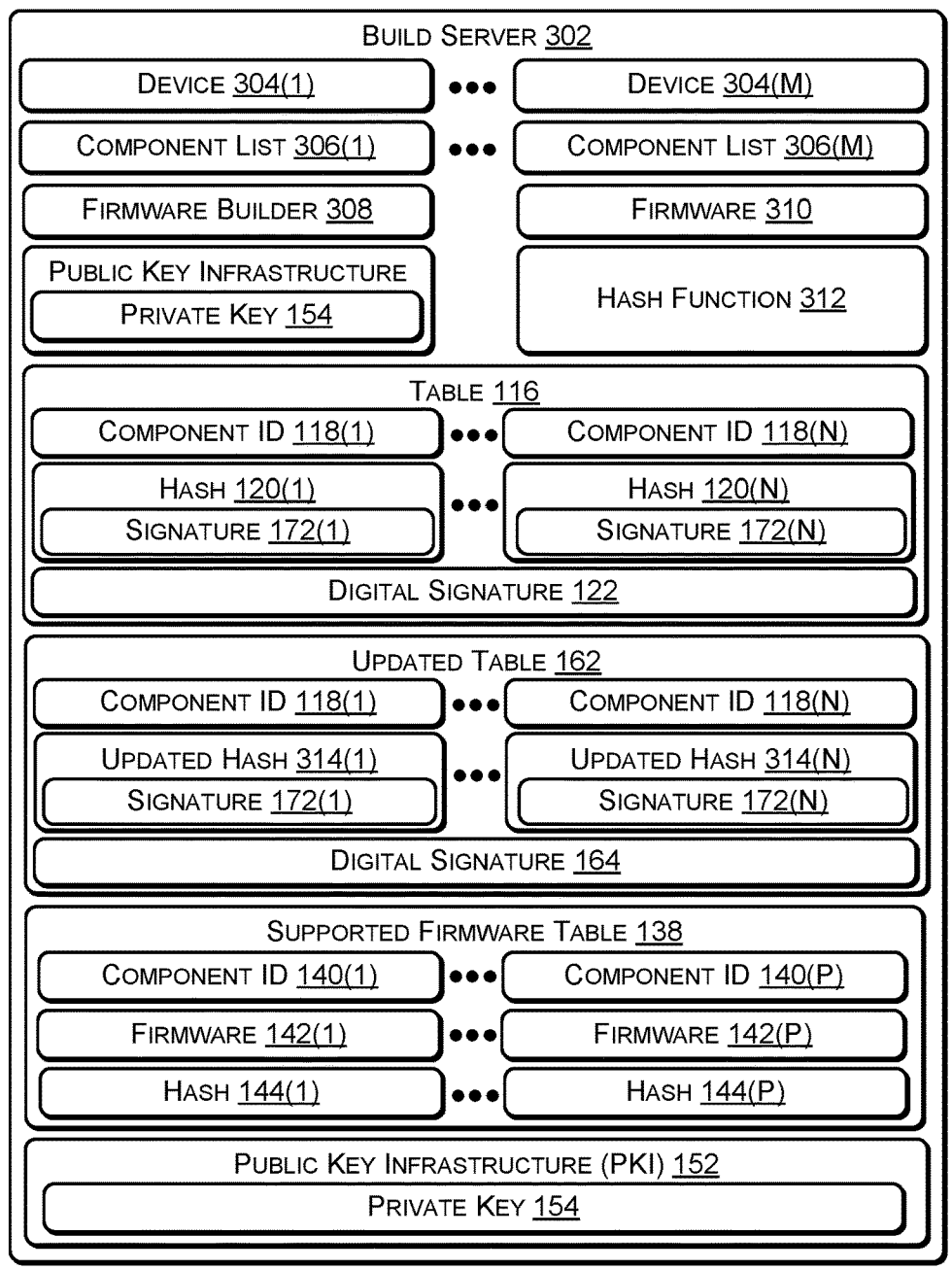
FIG. 3 is a block diagram of a system that includes a build server to build a firmware of individual components of a computing device, according to some embodiments.

FIG. 3 is a block diagram of a system 300 that includes a build server to build a firmware of individual components of a computing device, according to some embodiments. The build server 302 may be used to build firmware for a component, create a corresponding measurement (e.g., a hash value), sign the measurement to enable the authenticity of the measurement to be determined, and place the signed measurement along with a corresponding component identifier in a table of approved firmware (e.g., the table 116).

A computing device manufacturer (e.g., Dell®, HP®, Lenovo@, Asus®, or the like) may manufacture multiple devices, ranging from desktop computing devices, to laptop computing devices, to tablet computing devices. In addition, each type of device may have multiple products lines, including an enterprise product line (e.g., Dell® Latitude®), a gaming product line (e.g., Dell® Alienware®), a workstation product line (e.g., Dell® Precision®), and a consumer product line (e.g., Dell® Inspiron®). While some components may be common among multiple product lines, other components may be specific to a particular product line. For example, enterprise products may use hard drives capable of high throughput and redundancy. Gaming products may use components capable of supporting high resolution video cards, high speed input/output (I/O) ports (e.g., USB ports), and the like.

The build server 302 may select a device, of multiple devices 304(1) to 304(M) (M>0), for which to build the table 116. The build server 302 may select a corresponding component list, from component list 306(1) to component list 306(M). For example, if the build server 302 selects the device 304(M), then the build server 302 may select the corresponding component list 306(M). The build server 302 may select a particular component ID 118 from the selected one of the component lists 306, use a firmware builder 308 to build a firmware 310 for the component, use a hash function 312 to create one of the hashes 120, sign the hash 120 with the signature 172 using the private key 154 of the PKI 152, and place the component ID 118 along with the corresponding hash 120 (e.g., with the signature 172) in the table 116. The build server 302 may repeat the process, e.g., starting with selecting a particular component ID 118, until all the component IDs 118 in the component list 306 have been selected, and a signed hash created for each component ID 118 in the table 116.

If a manufacturer updates the firmware of a component in the component list 306(M), the build server 302 may create the updated table 162 that includes updated hash 314(1) to updated hash 314(N). The build server 302 may provide the updated table 162 to the server 104 of FIG. 1 to enable computing devices, such as the computing device 102, to download the updated table 162.

In the flow diagram of FIGS. 4, 5, 6, and 7, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 400, 500, 600, and 700 are described with reference to FIGS. 1, 2, and 3, as described above, although other models, frameworks, systems and environments may be used to implement these processes.

Figure 4:
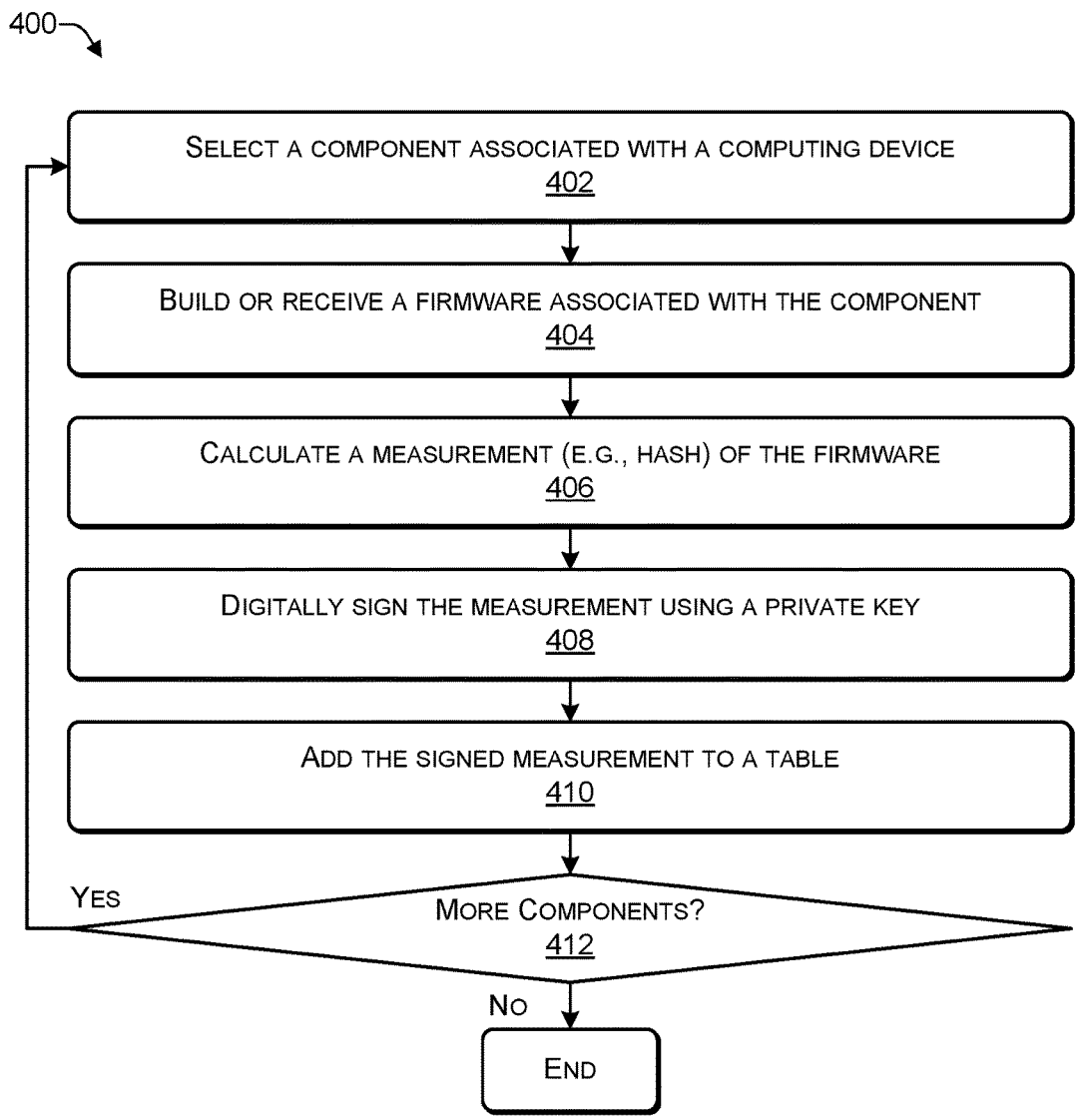
FIG. 4 is a flowchart of a process that includes creating a signed measurement associated with a firmware of a component, according to some embodiments.

FIG. 4 is a flowchart of a process 400 that includes creating a signed measurement associated with a firmware of a component, according to some embodiments. For example, the process 400 may be performed by a server, such as the build server 302 of FIG. 3.

At 402, a component associated with a computing device may be determined. At 404, a firmware associated with the selected component may be built or may be received from a third party (e.g., a manufacturer of the selected component). For example, in some cases, the build server may compile code associated with the firmware of the component to create executable code. In other cases, the build server may receive the executable firmware code from a third party, such as manufacturer of the component. At 406, a measurement, such as a hash, of the firmware may be determined. At 408, the measurement may be digitally signed using a private key. At 410, the signed measurement may be added to a table. For example, in FIG. 3, the build server 302 may select a device, of multiple devices 304(1) to 304(M) (M>0), and build the table 116 for inclusion in the device (e.g., the computing device 102 of FIG. 1). The build server 302 may select a corresponding one of the component lists 306. For example, if the build server 302 selects the device 304(M), then the build server 302 may select the corresponding component list 306(M). The build server 302 may select the particular component ID 118 from the selected one of the component lists 306, use the firmware builder 308 to build the firmware 310 (e.g., executable code) for the component, use the hash function 312 to create one of the hashes 120, sign the hash 120 with the signature 172 using the private key 154 of the PKI 152, and place the component ID 118 along with the corresponding hash 120 (e.g., with the signature 172) in the table 116.

At 412, a determination can be made whether there are more components of the computing device. If a determination is made that there are more components of the computing device, at 412, then the process may proceed to 402 and a next component associated with the computing device may be selected. If a determination is made, at 412, that there are no more components associated with the computing device, the process may end. For example, in FIG. 3, the build server 302 may select the new component ID 118 in the selected component list 306(M), use the firmware builder 308 to build the firmware 310 (e.g., executable code) for the component associated with the selected component ID 118, use the hash function 312 to create one of the hashes 120, sign the hash 120 with the signature 172 using the private key 154 of the PKI 152, and place the component ID 118 along with the corresponding hash 120 (e.g., with the signature 172) in the table 116. After all the components in the component list 306(M) have been selected and a corresponding hash created, signed, and placed in the table 116, the process may end.

Figure 5:
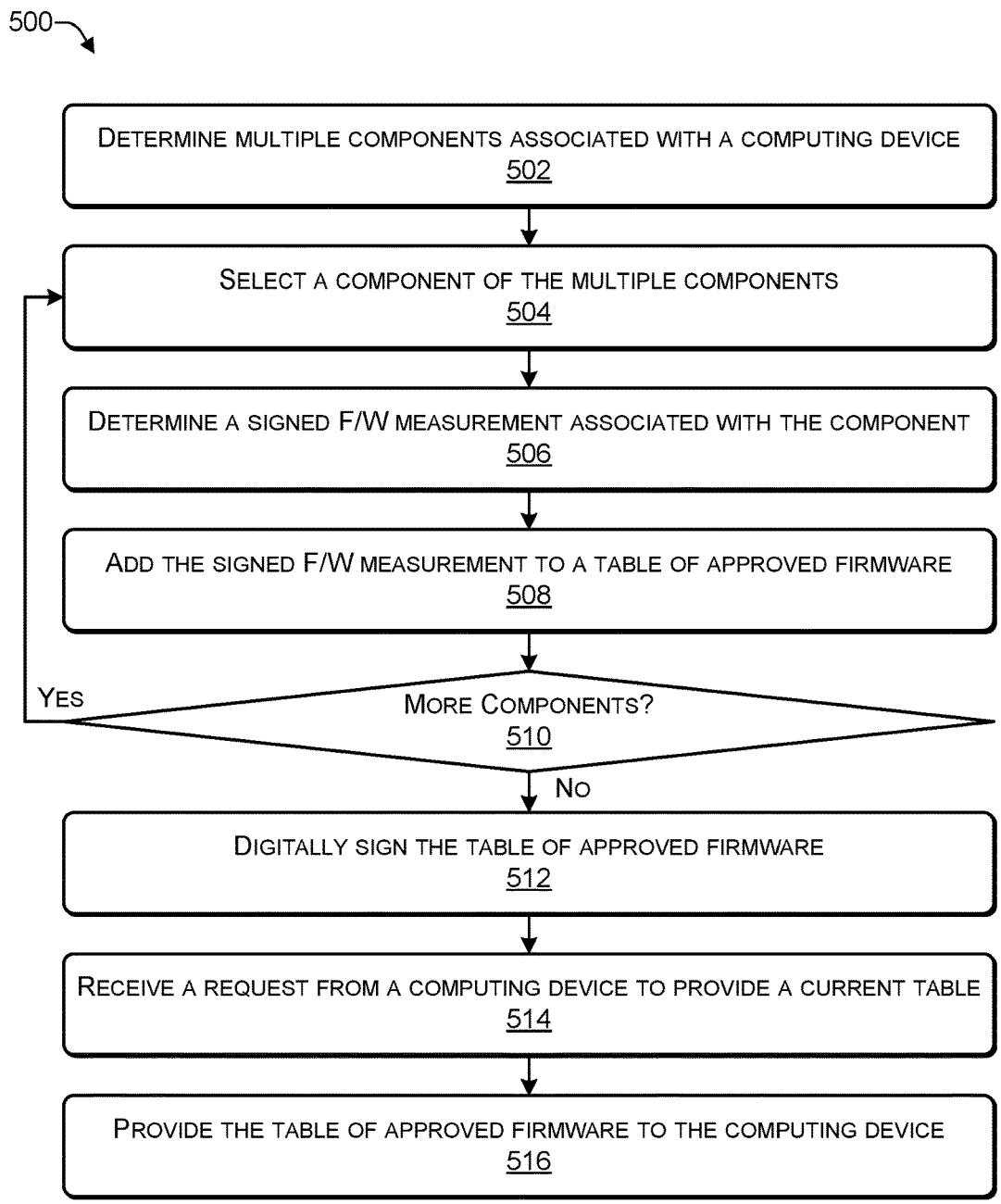
FIG. 5 is a flowchart of a process that includes creating a digitally signed table of approved firmware, according to some embodiments.

FIG. 5 is a flowchart of a process 500 that includes creating a digitally signed table of approved firmware, according to some embodiments. The process 500 may be performed by a server, such as the server 302 of FIG. 3.

At 502, multiple components associated with a computing device may be determined. At 504, a component of the multiple components may be selected. At 506 a signed firmware associated with the component may be determined. At 508, the signed firmware may be added to a table of approved firmware. For example, in FIG. 3, the server 302 may determine that the component list 306(M) includes a list of the components included in the computing device 102. The server 302 may select one of the component IDs 118 in the component list 306(M) and determine the measurement (e.g., hash) 120 of the firmware 310 associated with the component ID 118. The server 104 may add the signed firmware measurement 120 to the table 116.

At 510, determination may be made whether there are more components associated with the computing device. If a determination is made at 510 that there are more components associated with the computing device, then the process may proceed to 504 where a next component of the multiple components may be selected. If a determination is made at 510 that there are no more components associated with the computing device, then the process may proceed to 512 where the table of approved firmware may be digitally signed. For example, the process 500 may repeat 504 to 508 until all the component IDs in the component list 306(M) of FIG. 3 have been selected. After all the signed measurements associated with component IDs of the components in the component list 306(M) have been added to the table 116, the build server 302 may add the digital signature 122 to the table 116 to enable a computing device (e.g., the computing device 102 of FIG. 1) to verify the authenticity of the table 116.

At 514, a request from a computing device to provide a current table may be received. At 516, the table of approved firmware may be provided to the computing device. The server 104 may digitally sign the table of approved firmware 116, for example, by providing the digital signature 122. When the server 104 receives the table request 160 from the computing device 102, the server 104 may send the updated table 162 to the computing device. For example, in FIG. 1, the server 104 may receive the table request 160 from the computing device 102 and send the updated table 162 to the computing device 102. The updated table 162 may include the digital signature 164.

Figure 6:
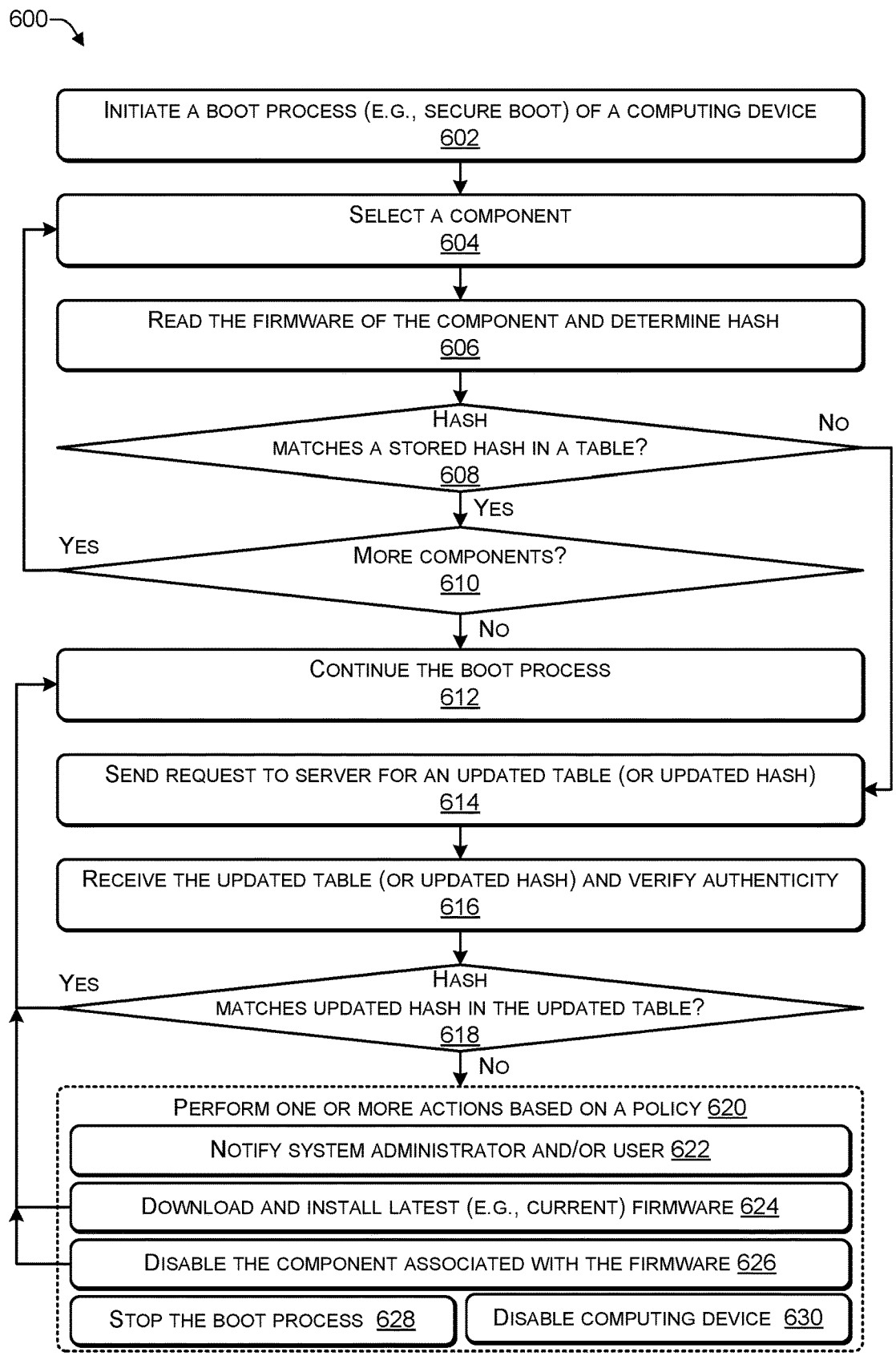
FIG. 6 is a flowchart of a process that includes determining a hash of a firmware of a component, according to some embodiments.

FIG. 6 is a flowchart of a process 600 that includes determining a hash of a firmware of a component, according to some embodiments. The process 500 may be performed by a BIOS such as the BIOS 112 of FIG. 1.

At 602, a boot process of a computing device may be initiated. For example, in FIG. 1, when a boot process of the computing device 102 is initiated, the BIOS 112 may perform a secure boot that includes extending a root of trust of the BIOS 112 to each of the firmware 110 of the components 108.

At 604, a component associated with the computing device may be selected. At 606, the firmware of the component may be read and a measurement (e.g., a hash value) associated with the firmware determined. At 608, a determination may be made whether the hash matches a stored hash in a table. If a determination is made at 608 that the hash matches the stored hash in the table, then the process may proceed to 610 where a determination may be made whether there are more components associated with the computing device. If a determination is made, at 610 that there are more components associated with the computing device, then the process may proceed to 604 where a next component may be selected. For example, in FIG. 1, during the boot process, the BIOS 112 may select a component, such as the component 108(N), read the corresponding firmware 110(N), determine a firmware hash 156 for the firmware 110(N), and perform a comparison of the firmware hash 156 with the hash 120(N) stored in the table 116 (e.g., the component ID 118(N) identifies the component 108(N), indicating that the hash 120(N) associated with the firmware 110(N)). Prior to making the comparison, the BIOS 112 may verify an authenticity of the hash 120(N) by using a public key 158 (e.g., provided by the PKI 152) to verify the signature 172(N) associated with the hash 120(N). After verifying the authenticity of the hash 120(N) in the table 116, if the BIOS 112 determines that the firmware hash 156 (of the firmware 110(N)) matches the hash 120(N) in the table 116. The process may repeat 604 through 610 until the firmware 110 of all the components 108 has been selected.

If a determination is made, at 608 that the hash of the firmware of the component does not match the stored hash in the table, then the process may proceed to 614. At 614, the hash may be sent to a server and an updated table may be requested. At 616, the updated table may be received and the authenticity of the updated table verified. At 618, a determination may be made whether the hash associated with the firmware of the component matches the stored hash in the updated table. If a determination is made, at 618, that the hash associated with the firmware of the component matches the stored hash in the updated table, then the process may proceed to 612 where the boot process continues. For example, in FIG. 1, the BIOS 112 may select the component 108(N), read the firmware 110(N), and determine the firmware hash 156 associated with the firmware 110(N). The BIOS 112 may verify the signature 172(N) of the hash 120(N) and compare the firmware hash 156 with the hash 120(N) corresponding to the component 108(N) to determine if there is a match. If the firmware hash 156 of the firmware 110(N) does not match the corresponding hash 120(N) in the table 116, then the BIOS 112 may use the BIOS network utility 132 (or similar feature) to connect to the server 104 and send a table request 160 requesting an updated table. The server 104 may receive the table request 160 and, in response, send an updated table 162 that includes a latest set of hashes associated with the component identifiers 118. The updated table 162 may include a digital signature 164. The BIOS 112 may receive the updated table 162 and use the public key 158 to verify the digital signature 164 to determine an authenticity of the updated table 162. After verifying the digital signature 164 of the updated table 162 using the public key 158, the BIOS 112 may replace the table 116 with the updated table 162. The updated table 162 may include the component identifiers 118 and updates to the hashes 120. The BIOS 112 may compare the firmware hash 156 with the corresponding hash in the updated table 162. If the firmware hash 156 matches the updated hash in the updated table 162, then the BIOS 112 may continue with the boot process.

If a determination is made, at 618, that the hash of the firmware of the component fails to match the stored hash in the updated table, then the process may proceed to 620, where one or more actions may be performed based on a policy. For example, the one or more actions may include: (1) notifying, at 622, a system administrator and/or a user, (2) downloading and installing the latest firmware in the component, (3) disabling, at 626, the component associated with the firmware, (4) stopping, at 628, the boot process or (5) disabling, at 630, the computing device (e.g., by preventing the computing device from booting). In FIG. 1, if the BIOS 112 determines that the hash 156 does not match the corresponding hash in the updated table 162, then the BIOS 112 may perform one or more actions based on the policy 130. For example, the BIOS 112 may send a message to a system administrator based on the policy 130 indicating that one of the firmware 110 associated with the components 108 cannot be verified and may be corrupted or malicious. As another example, the BIOS 112 may display an error message to a user of the computing device 102 indicating that a firmware 110 of a particular one of the components 108 could not be verified. In some cases, based on the policy 130, the BIOS 112 may disable the component (e.g., 108(N)) associated with the firmware (e.g., 110(N)) and resume the boot process. For example, if the BIOS 112 determines that the firmware hash 156 of the firmware 110(N) does not match the corresponding hash 120(N) in the table 116 or in the updated table 162, the BIOS 112 may disable the component 108(N) and resume the boot process. In some cases, based on the policy 130, the BIOS 112 may stop the boot process and notify a system administrator and/or a user of the computing device 102 that one of the components 108 has unknown (e.g., unverifiable) firmware 110 and the boot process has been halted. In some cases, based on the policy 130, the BIOS 112 may automatically download and install updated firmware for a component (e.g., the component 108(N)) based on the policy 130. For example, the BIOS 112 may use the BIOS network utility 132 (or similar BIOS utility, such as, for example, Dell® BIOSConnect®) to send a firmware request 166 to the server 104. In response, the server 104 may send updated firmware 168 that includes a signature 170 to the computing device 102. The BIOS 112 may receive the updated firmware 162 and verify an authenticity of the updated firmware 168 by using the public key 158 to verify the signature 170 of the updated firmware 168. The BIOS 112 may use the updated firmware 168 to replace the firmware (e.g., 110(N)) whose hash did not match a corresponding hash 120 in either the table 116 or in the updated table 162. For example, the BIOS 112 may determine the firmware hash 156 of the firmware 110(N) does not match the hash 120(N) in the table 116 or in the updated table 162. The BIOS 112 may send the firmware request 166, receive the updated firmware 168, verify the signature 170 using the public key 158, and replace the firmware 110(N) with the updated firmware 168. This process of replacing the firmware 110 of one of the components 108 may be done automatically and without notifying the user of the computing device 102. For example, the user may be unaware that the firmware 110 of one or more of the components 108 was replaced.

Figure 7:
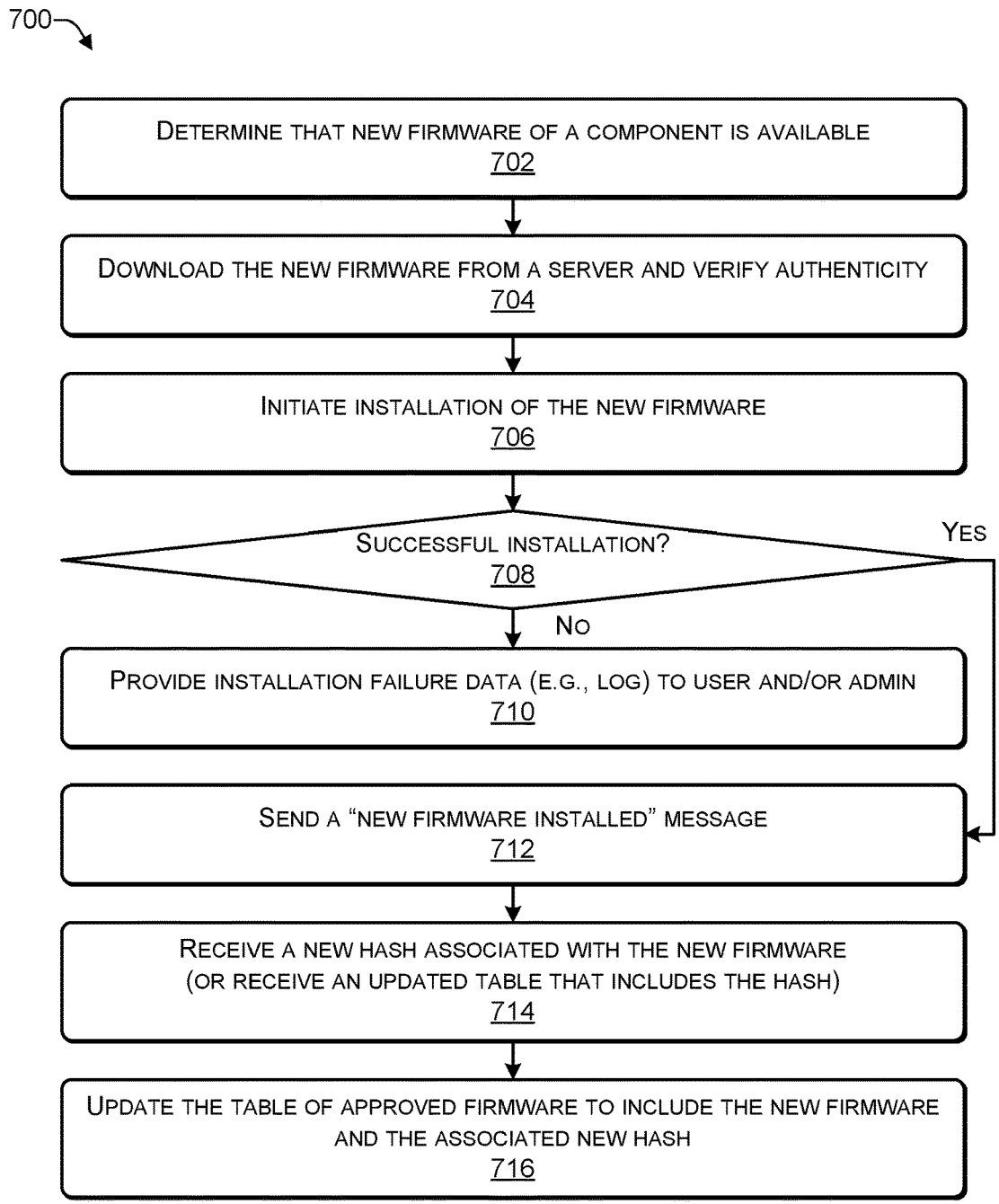
FIG. 7 is a flowchart of a process that includes updating a measurement (e.g., hash) associated with new firmware, according to some embodiments.

FIG. 7 is a flowchart of a process 700 that includes updating a measurement (e.g., hash) associated with new firmware, according to some embodiments. The process 700 may be performed by a computing device, such as the computing device 102 of FIG. 1.

At 702, a determination may be made that new firmware is available for a component of a computing device. At 704, the new firmware may be downloaded and the authenticity of the firmware verified. For example, in FIG. 1, the computing device 102 may be notified by a manufacturer of one of the components 108 that new firmware is available. The computing device 102 may download the updated firmware 168 and verify the signature 170 using the public key 158.

At 706, installation of the new firmware may be initiated. At 708, a determination may be made whether the new firmware successfully installed. If a determination is made that the installation was unsuccessful, then installation failure data (e.g., installation log) may be provided to a user and/or an administrator. For example, in FIG. 1, the computing device 102 may initiate installation of the updated firmware 168. If the computing device 102 is unable to install the updated firmware 168, the computing device 102 may provide an installation log to a user and/or system administrator.

If a determination is made, at 708, that the installation was successful, then the process may proceed to 712. At 712, a "new firmware installed" message may be sent to a user of the computing device, to a network system administrator, to the server, or placed in a log file. At 714, a new hash associated with the new firmware may be received from the server. At 716, the table of approved firmware may be updated to include the new firmware and the associated new hash. For example, in FIG. 1, if the computing device 102 is able to successfully install the updated firmware 168, the computing device 102 may send the firmware installed message 174 to the server 104. The server 104 may send the updated firmware hash 176 (e.g., corresponding to the updated firmware 168) to the computing device 102. The computing device 102 may update the table 116 to include the updated firmware 168 and updated firmware hash 176.

Figure 8:
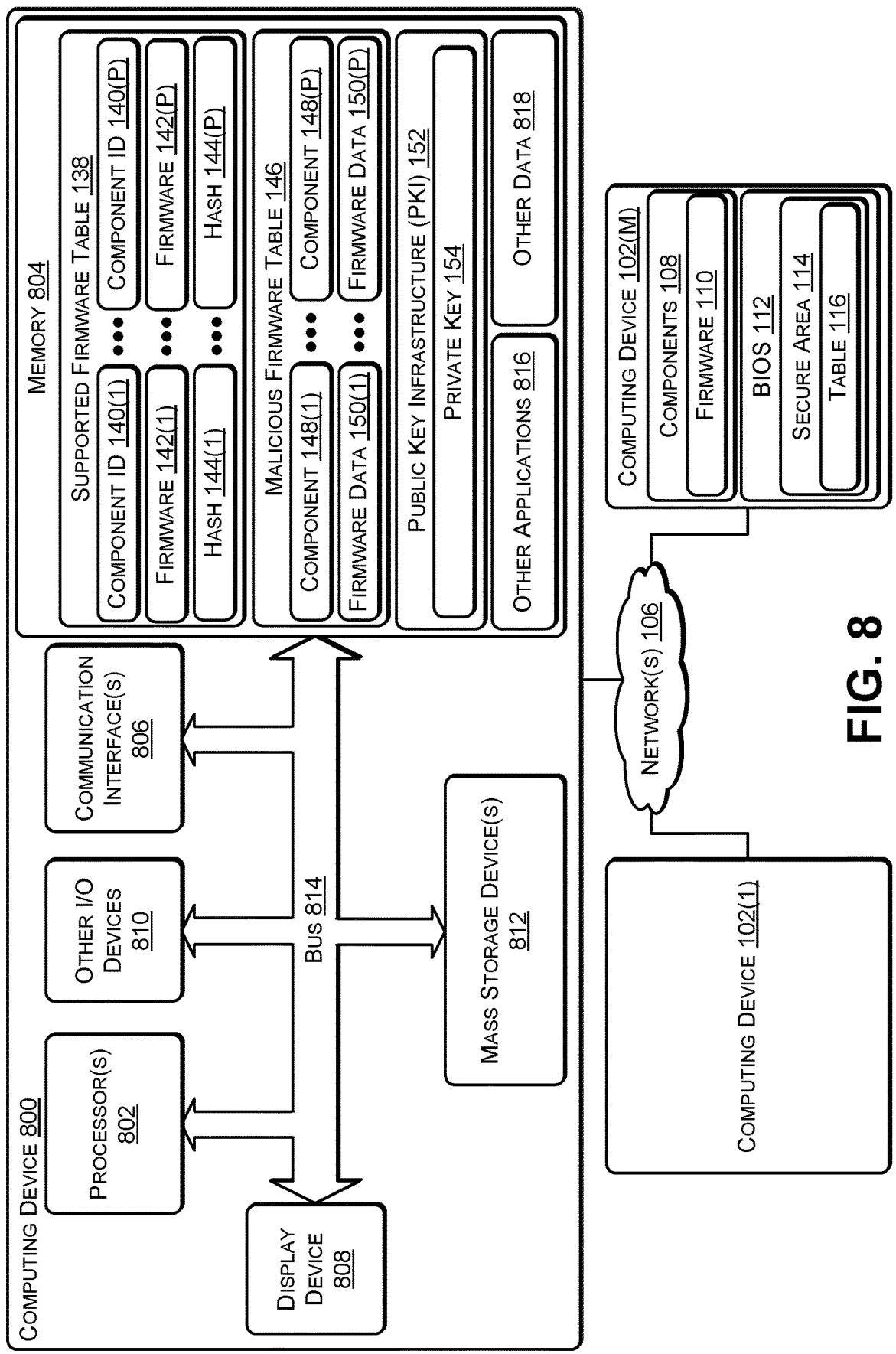
FIG. 8 illustrates an example configuration of a computing device that can be used to implement the systems and techniques described herein.

FIG. 8 illustrates an example configuration of a computing device 800 that can be used to implement the systems and techniques described herein, such as for example, the computing devices 102 and the nodes 104 of FIG. 1. For illustration purposes, the computing device 800 is illustrated in FIG. 8 as implementing the node 104(N) of FIG. 1.

The computing device 800 may include one or more processors 802 (e.g., CPU, GPU, or the like), a memory 804, communication interfaces 806, a display device 808, other input/output (I/O) devices 810 (e.g., keyboard, trackball, and the like), and one or more mass storage devices 812 (e.g., disk drive, solid state disk drive, or the like), configured to communicate with each other, such as via one or more system buses 814 or other suitable connections. While a single system bus 814 is illustrated for ease of understanding, it should be understood that the system buses 814 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 802 are one or more hardware devices that may include a single processing unit or a number of processing units, all of which may include single or multiple computing units or multiple cores. The processors 802 may include a graphics processing unit (GPU) that is integrated into the CPU or the GPU may be a separate processor device from the CPU. The processors 802 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 802 may be configured to fetch and execute computer-readable instructions stored in the memory 804, mass storage devices 812, or other computer-readable media.

Memory 804 and mass storage devices 812 are examples of computer storage media (e.g., memory storage devices) for storing instructions that can be executed by the processors 802 to perform the various functions described herein. For example, memory 804 may include both volatile memory and non-volatile memory (e.g., RAM, ROM, or the like) devices. Further, mass storage devices 812 may include hard disk drives, solid-state drives, removable media, including external and removable drives, memory cards, flash memory, floppy disks, optical disks (e.g., CD, DVD), a storage array, a network attached storage, a storage area network, or the like. Both memory 804 and mass storage devices 812 may be collectively referred to as memory or computer storage media herein and may be any type of non-transitory media capable of storing computer-readable, processor-executable program instructions as computer program code that can be executed by the processors 802 as a particular machine configured for carrying out the operations and functions described in the implementations herein.

The computing device 800 may include one or more communication interfaces 806 for exchanging data via the network 106. The communication interfaces 806 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 806 can also provide communication with external storage, such as a storage array, network attached storage, storage area network, cloud storage, or the like.

The display device 808 may be used for displaying content (e.g., information and images) to users. Other I/O devices 810 may be devices that receive various inputs from a user and provide various outputs to the user, and may include a keyboard, a touchpad, a mouse, a printer, audio input/output devices, and so forth.

The computer storage media, such as memory 116 and mass storage devices 812, may be used to store software and data. For example, the computer storage media may be used to store the supported firmware table 138, the malicious firmware table 146, the PKI 152, other applications 816, and other data 818.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   initiating, by one or more processors, a boot process of a computing device comprising a plurality of hardware components;
   selecting, by the one or more processors, a component of the plurality of hardware components;
   reading, by the one or more processors, a firmware of the component;
   determining, by the one or more processors, a measurement of the firmware;
   performing, by the one or more processors, a comparison of the measurement with a pre-determined measurement stored in a table of approved firmware that is stored in a basic input output system (BIOS) of the computing device;
   determining, by the one or more processors and based on the comparison, that the measurement does not match the pre-determined measurement stored in the table of approved firmware;
   acquiring, by the one or more processors, a new table of approved firmware from a server;
   retrieving, by the one or more processors, a public key stored in the BIOS of the computing device;
   determining, by the one or more processors, that the new table is authentic by verifying a digital signature of the new table using the public key;
   replacing, by the one or more processors, the table of approved firmware with the new table after determining that the new table is authentic;
   determining, by the one or more processors, that the measurement does not match a current measurement stored in the new table;
   acquiring, by the one or more processors, a new firmware of the component from the server;
   installing, by the one or more processors, the new firmware to replace the firmware of the component; and
   performing, by the one or more processors, one or more actions based on a policy.

2. The method of claim 1, wherein performing the one or more actions based on the policy comprises performing at least one of:
   indicating that the firmware of the component is corrupted;
   disabling the component and resuming the boot process;
   halting the boot process; or
   resuming the boot process.

3. The method of claim 1, further comprising:
   reading a second firmware of a second component of the plurality of hardware components;
   determining a second measurement of the second firmware;
   determining that the second measurement matches a second pre-determined measurement stored in the new table; and
   resuming the boot process.

4. The method of claim 1, wherein:
   the public key is stored in a non-volatile random access memory (NVRAM) of the BIOS of the computing device.

5. The method of claim 1, further comprising:
   verifying a digital signature of the pre-determined measurement before performing the comparison of the measurement with the pre-determined measurement stored in the table of approved firmware.

6. The method of claim 1, further comprising:
   determining, from the server, that an updated firmware of a particular component of the plurality of hardware components is available;
   downloading the updated firmware from the server;
   verifying an authenticity of the updated firmware; and
   installing the updated firmware of the particular component.

7. The method of claim 6, further comprising:
   receiving, from the server, an updated measurement associated with the updated firmware; and
   modifying the table of approved firmware to include the updated measurement.

8. A computing device comprising:
   a basic input output system (BIOS) comprising:
      a table of approved firmware; and
      a public key;
   a plurality of hardware components;
   one or more processors; and
   one or more non-transitory computer readable media storing instructions executable by the one or more processors to perform operations comprising:
      initiating a boot process of the computing device;
      selecting a component of the plurality of hardware components;
      reading a firmware of the component;
      determining a measurement of the firmware;
      performing a comparison of the measurement with a pre-determined measurement stored in the table of approved firmware;
      determining, based on the comparison, that the measurement does not match the pre-determined measurement stored in the table of approved firmware;
      acquiring a new table of approved firmware from a server;
      determining that the new table is authentic by verifying, using the public key, a digital signature of the new table;
      replacing the table of approved firmware with the new table after determining that the new table is authentic;
      determining that the measurement does not match a current measurement stored in the new table;
      acquiring, by the one or more processors, a new firmware of the component from the server;
      installing, by the one or more processors, the new firmware to replace the firmware of the component; and
      performing one or more actions based on a policy.

9. The computing device of claim 8, wherein performing the one or more actions based on the policy comprises performing at least one of:
   indicating that the firmware of the component is corrupted;

disabling the component and resuming the boot process;
halting the boot process; or
resuming the boot process.

10. The computing device of claim 8, wherein the operations further comprise:
reading a second firmware of a second component of the plurality of hardware components;
determining a second measurement of the second firmware;
determining that the second measurement matches a second pre-determined measurement stored in the new table; and
resuming the boot process.

11. The computing device of claim 8, wherein the operations further comprise:
verifying, using the public key, a digital signature of the pre-determined measurement.

12. The computing device of claim 8, wherein the operations further comprise:
determining, from the server, that an updated firmware of a particular component of the plurality of hardware components is available;
downloading the updated firmware from the server;
verifying an authenticity of the updated firmware;
installing the updated firmware of the particular component;
receiving, from the server, an updated measurement associated with the updated firmware; and
modifying the table of approved firmware to include the updated measurement.

13. The computing device of claim 8, wherein the plurality of hardware components include at least two of:
an imaging device;
a keyboard;
a universal serial bus (USB) controller;
a display device;
a video card;
an audio card;
a hard disk drive;
a solid-state disk (SSD) drive;
a network interface card (NIC).

14. One or more non-transitory computer readable media storing instructions of a basic input output system (BIOS) of a computing device, the instructions executable by one or more processors to perform operations comprising:
initiating a boot process of a computing device comprising a plurality of hardware components;
selecting a component of the plurality of hardware components;
reading a firmware of the component;
determining a measurement of the firmware;
performing a comparison of the measurement with a pre-determined measurement stored in a table of approved firmware that is stored in the BIOS of the computing device;
determining, based on the comparison, that the measurement does not match the pre-determined measurement stored in the table of approved firmware;
acquiring a new table of approved firmware from a server;
retrieving a public key stored in the BIOS of the computing device;
of determining that the new table is authentic by verifying a digital signature of the new table using the public key;
replacing the table of approved firmware with the new table after determining that the new table is authentic;
determining that the measurement does not match a current measurement stored in the new table; acquiring a new firmware of the component from the server;
installing the new firmware to replace the firmware of the component; and
performing one or more actions based on a policy.

15. The one or more non-transitory computer readable media of claim 14, wherein the one or more actions comprise one or more of:
indicating that the firmware of the component is corrupted;
disabling the component and resuming the boot process;
halting the boot process; or
resuming the boot process.

16. The one or more non-transitory computer readable media of claim 14, wherein the operations further comprise:
reading a second firmware of a second component of the plurality of hardware components;
determining a second measurement of the second firmware;
determining that the second measurement matches a second pre-determined measurement stored in the new table; and
resuming the boot process.

17. The one or more non-transitory computer readable media of claim 14, wherein:
the public key is stored in a program hub controller (PCH) of the computing device.

18. The one or more non-transitory computer readable media of claim 14, wherein the operations further comprise:
verifying a digital signature of the pre-determined measurement before performing the comparison of the measurement with the pre-determined measurement stored in the table of approved firmware.

19. The one or more non-transitory computer readable media of claim 14, wherein the operations further comprise:
downloading, from the server, an updated firmware of a particular component of the plurality of hardware components;
verifying an authenticity of the updated firmware; and
installing the updated firmware of the particular component.

20. The one or more non-transitory computer readable media of claim 19, wherein the operations further comprise:
receiving, from the server, an updated measurement associated with the updated firmware; and
modifying the table of approved firmware to include the updated measurement.

* * * * *

UNITED STATES PATENT AND TRADEMARK OFFICE
CERTIFICATE OF CORRECTION

PATENT NO. : 10,776,488 B2
APPLICATION NO. : 16/139353
DATED : September 15, 2020
INVENTOR(S) : Balasingh P. Samuel and Richard M. Tonry It is certified that error appears in the above-identified patent and that said Letters Patent is hereby corrected as shown below:

In the Claims

Please correct Claim 14, Column 22, Line 3, and delete the word "of" before the word "determining".

Signed and Sealed this
Third Day of November, 2020

Andrei Iancu
*Director of the United States Patent and Trademark Office*